United States Patent
Min et al.

(10) Patent No.: US 11,996,585 B2
(45) Date of Patent: May 28, 2024

(54) BATTERY MODULE INCLUDING TERMINAL CONNECTING STRUCTURE PROVIDED WITH FLOATING NUT AND BATTERY PACK INCLUDING THE SAME

(71) Applicant: LG Chem, Ltd., Seoul (KR)

(72) Inventors: Dai Ki Min, Daejeon (KR); Youngho Lee, Daejeon (KR); Jongha Jeong, Daejeon (KR); Jungmin Kwak, Daejeon (KR); Jaehyun You, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 713 days.

(21) Appl. No.: 17/254,035

(22) PCT Filed: Feb. 20, 2020

(86) PCT No.: PCT/KR2020/002475
§ 371 (c)(1),
(2) Date: Dec. 18, 2020

(87) PCT Pub. No.: WO2020/171629
PCT Pub. Date: Aug. 27, 2020

(65) Prior Publication Data
US 2021/0265705 A1    Aug. 26, 2021

(30) Foreign Application Priority Data
Feb. 21, 2019    (KR) .................. 10-2019-0020751

(51) Int. Cl.
*H01M 50/517* (2021.01)
*H01M 50/211* (2021.01)
(Continued)

(52) U.S. Cl.
CPC ....... *H01M 50/517* (2021.01); *H01M 50/211* (2021.01); *H01M 50/296* (2021.01);
(Continued)

(58) Field of Classification Search
None
See application file for complete search history.

(56) References Cited

U.S. PATENT DOCUMENTS 4,908,738 A * 3/1990 Kobari .................. H02M 7/003
439/74
7,887,943 B2   2/2011 Yoshikane et al.
(Continued)

FOREIGN PATENT DOCUMENTS

CN    204230333 U    3/2015
CN    207183361 U    4/2018
(Continued)

OTHER PUBLICATIONS

Search Report dated Jun. 18, 2022 from Office Action for Chinese Application No. 202080002948.4 dated Jun. 28, 2022. 3 pgs.
(Continued)

*Primary Examiner* — Lisa S Park
(74) *Attorney, Agent, or Firm* — Lerner David LLP (57) ABSTRACT

A battery module of the present disclosure may include, a cell assembly including at least one battery cell, a busbar assembly including a terminal busbar electrically connected to an electrode lead of the cell assembly, and a busbar frame covering the cell assembly on at least one side, and an insulating frame covering the busbar assembly from the outside, and further including a nut which is set to a floatable size in a nut insertion chamber adjacent to a terminal busbar and provided with a space inside the insulating frame, and is mounted in the nut insertion chamber.

12 Claims, 9 Drawing Sheets

(51) Int. Cl.
*H01M 50/271* (2021.01)
*H01M 50/296* (2021.01)
*H01M 50/50* (2021.01)
*H01M 50/521* (2021.01)

(52) U.S. Cl.
CPC ......... *H01M 50/50* (2021.01); *H01M 50/521* (2021.01); *H01M 50/271* (2021.01); *H01M 2220/20* (2013.01)

(56) References Cited

U.S. PATENT DOCUMENTS

| 8,038,487 | B2 | 10/2011 | Tsuchiya et al. |
| 10,170,740 | B2 | 1/2019 | Kusama et al. |
| 2003/0141842 | A1 | 7/2003 | Izawa et al. |
| 2004/0047705 | A1 | 3/2004 | Cutshall |
| 2006/0105624 | A1 | 5/2006 | Yoshikane et al. |
| 2011/0092111 | A1 | 4/2011 | Tsuchiya et al. |
| 2018/0190964 | A1 | 7/2018 | Caumont |
| 2019/0020010 | A1 | 1/2019 | Yamanaka |
| 2021/0159572 | A1 | 5/2021 | Kubota et al. |

FOREIGN PATENT DOCUMENTS

| CN | 208111553 | U | 11/2018 |
| EP | 1116890 | A1 | 7/2001 |
| JP | 2003229106 | A | 8/2003 |
| JP | 2005347043 | A | 12/2005 |
| JP | 2006147319 | A | 6/2006 |
| JP | 2009301874 | A | 12/2009 |
| JP | 2014197516 | A | 10/2014 |
| JP | 2015022987 | A | 2/2015 |
| JP | 2016031910 | A | 3/2016 |
| JP | 2017016934 | A | 1/2017 |
| JP | 2019021408 | A | 2/2019 |
| KR | 19940025766 | U | 11/1994 |
| KR | 19990010996 | U | 3/1999 |
| KR | 20070080871 | A | 8/2007 |
| KR | 20090000292 | A | 1/2009 |
| KR | 20110008323 | A | 1/2011 |
| KR | 20140085890 | A | 7/2014 |
| KR | 20160068445 | A | 6/2016 |
| WO | 2019054079 | A1 | 3/2019 |

OTHER PUBLICATIONS

International Search Report for Application No. PCT/KR2020/002475 dated Jun. 3, 2020, 1 page.
Supplemental European Search Report for Application No. 20758613.2 dated Jul. 28, 2021. 2 pgs.

\* cited by examiner

BATTERY MODULE INCLUDING TERMINAL CONNECTING STRUCTURE PROVIDED WITH FLOATING NUT AND BATTERY PACK INCLUDING THE SAME

CROSS-REFERENCE TO RELATED APPLICATION(S)

This application is a national phase entry under 35 U.S.C. § 371 of International Application No. PCT/KR2020/002475, filed Feb. 20, 2020, which claims the benefit of Korean Patent Application No. 10-2019-0020751 filed with the Korean Intellectual Property Office on Feb. 21, 2019, and all the benefits accruing therefrom, the contents of which are incorporated by reference in their entirety.

TECHNICAL FIELD

The present disclosure relates to a battery module and a battery pack, and more particularly, to a battery pack including a battery module electrically connected through a terminal connecting structure.

BACKGROUND ART

Since secondary batteries are easily applied to various product groups and have electrical characteristics such as high energy density, they are universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

When a plurality of battery cells are connected in series or in parallel to configure a battery pack, it is common to configure a battery module composed of at least one battery cell first, and then configure a battery pack by using at least one battery module and adding other components. The number of battery cells included in the battery pack, or the number of battery cells included in the battery module may be variously set according to the required output voltage or the demanded charge/discharge capacity.

In order to connect a plurality of battery modules with each other, a terminal connecting structure may be fastened between adjacent battery modules, where a bolt and nut fastening structure may be applied. However, in order to assemble a bolt to a nut that is completely fixed to the battery module, precise position control is required, which may result in a deterioration in assembling properties of the relative bolt and an increase in the defect rate.

In addition, additional processes such as bonding and welding are required to constrain the nut to the battery module, leading to an increase in component prices.

DETAILED DESCRIPTION OF THE INVENTION

Technical Problem

An object of the present disclosure is directed to provide a battery module with improved bolt and nut assembling properties by creating a structure in which a nut can float in a terminal connecting structure between battery modules.

Another object of the present disclosure is directed to provide a battery pack configured to mutually fasten a plurality of battery modules having a floatable nut structure by a terminal connecting structure.

However, the problem to be solved by the embodiments of the present disclosure is not limited to the above-described problems, and can be variously expanded within the scope of the technical idea included in the present disclosure.

Technical Solution

A battery module according to one embodiment of the present disclosure may comprise cell assembly including at least one battery cell; a busbar assembly including a terminal busbar electrically connected to an electrode lead of the cell assembly, and a busbar frame covering the cell assembly on at least one side; and an insulating frame covering the busbar assembly from an outside, and further including a nut which is set to float in a nut insertion chamber adjacent to the terminal busbar and provided with a space inside the insulating frame, and whereby the nut is mounted in the nut insertion chamber.

The nut insertion chamber may have a rectangular planar cross-section, and the width of a first direction of the nut may be formed to be smaller than the width of a first direction of the nut insertion chamber.

The width of a second direction crossing the first direction of the nut may be formed to be smaller than the width of a second direction of the nut insertion chamber.

A fastening hole may be formed in the terminal busbar, and the nut may be mounted in the nut insertion chamber such that a screw hole of the nut at least partially overlaps with the fastening hole.

The diameter of the fastening hole of the terminal busbar may be formed to be larger than the diameter of the screw hole of the nut.

The nut insertion chamber may be disposed on both sides of the insulating frame in a planar direction.

The nut may have a screw hole with an edge that is inclined towards an inlet of the nut insertion chamber.

The insulating frame may include an insulating cover positioned adjacent to the busbar assembly, and an outer cover covering the insulating cover and fixing a terminal connecting structure, and the nut insertion chamber may be provided on the insulating cover.

According to another embodiment of the present disclosure, there can be provided a battery pack including a plurality of battery modules and a bolt that penetrates through the fastening hole of the terminal busbar and the bolt is screw-coupled to the screw hole of the nut.

The battery pack may include a terminal connecting structure having an inter-module busbar connecting a terminal busbar of an adjacent battery module, and the bolt may be coupled to the nut through the inter-module busbar.

The bolt may be fixed to the insulating frame through the screw hole of the nut.

According to yet another embodiment of the present disclosure, there can be provided a device including the at least one battery pack.

Advantageous Effects

According to one embodiment, a nut is mounted on the outer terminal connection part of the battery module to secure a floatable space, thereby improving the ease of fastening with a bolt for connection with an adjacent battery module.

In addition, since precise position control of bolts and nuts is not required, the assembly speed can be improved, and the defect rate due to assembly errors can be reduced.

Furthermore, since an additional process for constraining the nut to the outside of the battery module is not required, it is possible to prevent an increase in component prices.

BRIEF DESCRIPTION OF THE DRAWINGS

FIGS. 6a and 6b are schematic diagrams illustrating the relative positions of the bolt end, the fastening hole of the terminal busbar, and the screw hole of the nut in a state where the terminal connecting structure is fastened to the battery module according to one embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

Figure 1:
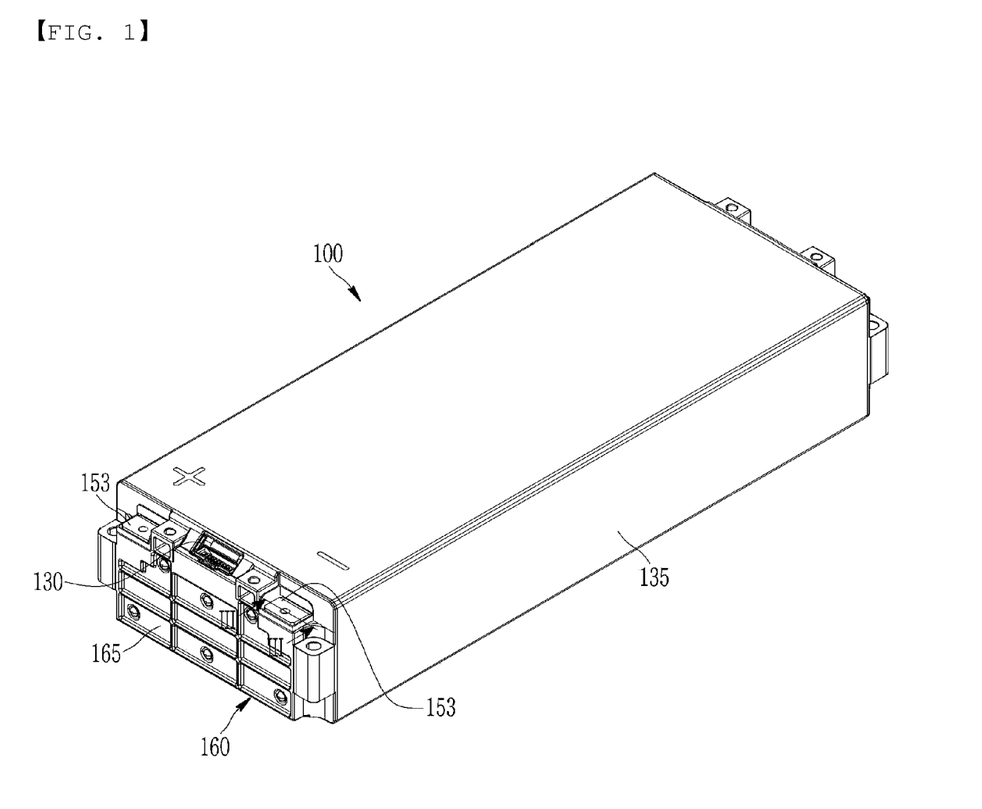
FIG. 1 is a perspective view illustrating a battery module according to one embodiment of the present disclosure.
Figure 2:
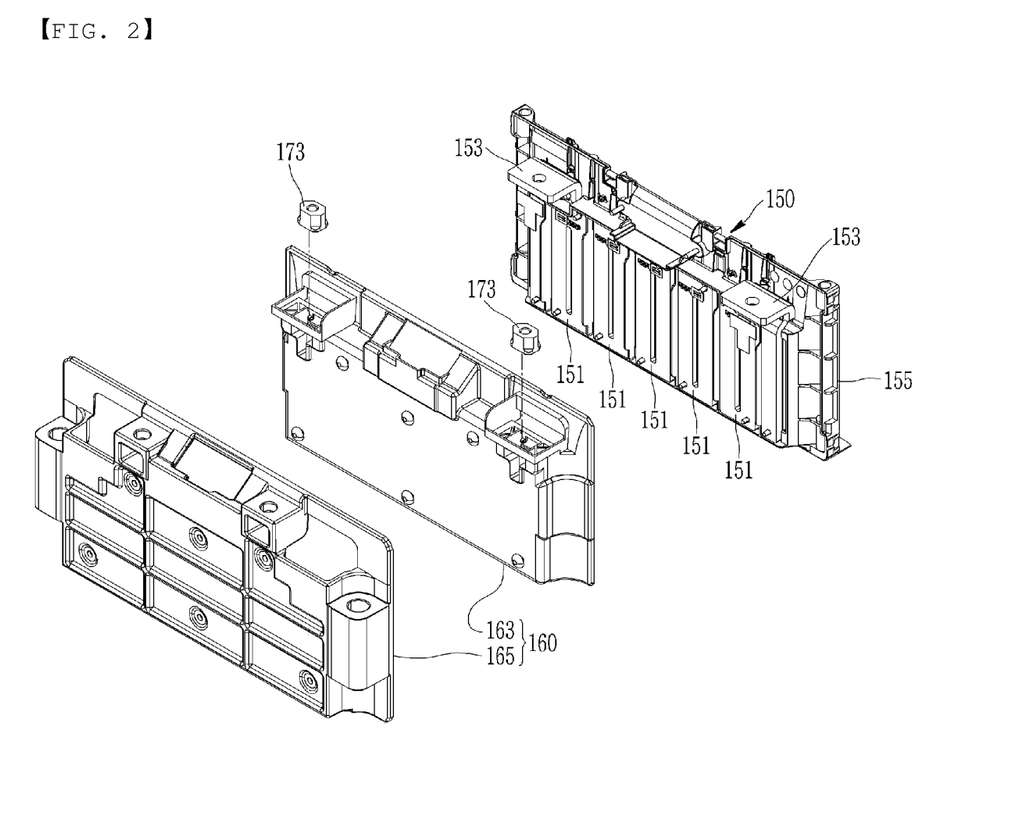
FIG. 2 is an exploded perspective view illustrating a busbar assembly, an insulating cover, and an outer cover of a battery module according to one embodiment of the present disclosure.

FIG. 1 is a perspective view illustrating a battery module according to one embodiment of the present disclosure and FIG. 2 is an exploded perspective view illustrating a busbar assembly, an insulating cover, and an outer cover of a battery module according to one embodiment of the present disclosure.

Referring to FIGS. 1 and 2, the battery module 100 according to the present embodiment includes a cell assembly, a busbar assembly 150 and an insulating frame 160 on at least one side of a module case 135 that accommodates the cell assembly and forms the exterior of the battery module 100. The busbar assembly 150 may be configured such that a busbar 151 is fixed towards the outside on a busbar frame 155 located on the side of the direction in which an electrode lead of the cell assembly is drawn out. The electrode lead of the cell assembly may be electrically connected to the busbar 151 through a slit formed in the busbar frame 155. The insulating frame 160 may include an insulating cover 163 and an outer cover 165 located outside the busbar assembly 150. The insulating cover 163 is located adjacent to the busbar assembly 150, and the outer cover 165 covers the insulating cover 163 and is located outside thereof.

Each of the insulating cover 163, the outer cover 165, and the busbar frame 155 constituting the insulating frame 160 may be made of non-conductive injected materials.

Battery cells constituting the cell assembly may be provided as a pouch-type secondary battery, and may be provided by stacking a plurality of battery cells in the cell assembly. The plurality of battery cells may be electrically connected to each other, and each of the battery cells may include an electrode assembly, a battery case accommodating the electrode assembly, and an electrode lead protruding out of the battery case and electrically connected to the electrode assembly.

Further, the battery module 100 may include various electric components, and may include, for example, an internal circuit board (ICE) and a battery management system (EMS). Electric components such as the ICE and the EMS board may be electrically connected to the plurality of battery cells.

The battery module 100 may form a module terminal portion so that a plurality of cells can be electrically coupled to each other. In the present embodiment, the battery module 100 may include terminal busbars 153 located on both outermost sides of the busbars fixed to the busbar frame 155. A terminal busbar 153 may include a plate that is bent vertically with respect to the main surface of the busbar frame 155 from the upper end, and a fastening hole may be formed in the plate.

Figure 3:
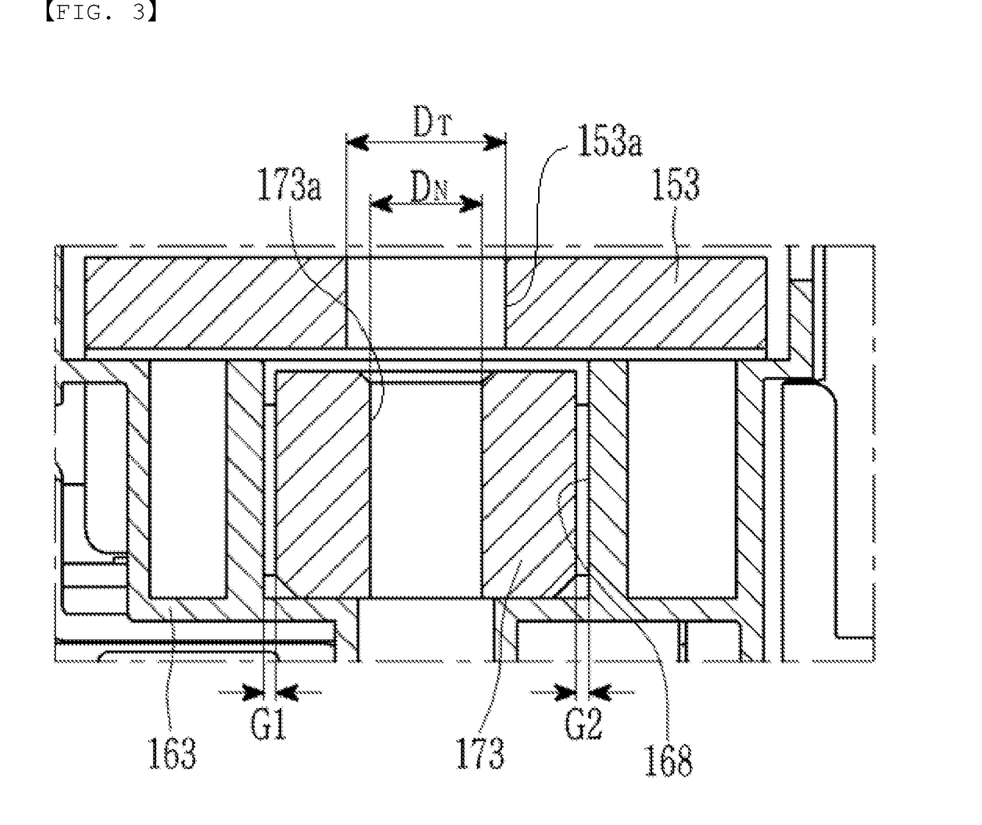
FIG. 3 is a cross-sectional view taken along line III-III of FIG. 1.

FIG. 3 is a cross-sectional view taken along line III-III of FIG. 1.

A nut insertion chamber 168 may be provided adjacent to a terminal busbar 153 in the insulating cover 163. A space is provided in the nut insertion chamber 168 such that a nut 173 can be mounted, and the nut 173 may be set to a floatable size within the nut insertion chamber 168. In this embodiment, the nut insertion chamber 168 has a substantially rectangular planar cross-section, and the width of the nut 173 in the first direction may be formed to be smaller than the width of the nut insertion chamber 168 in the first direction. Here, the first direction may be defined as a direction parallel to the long side of the insulating cover 163. Accordingly, as shown in FIG. 3, the space between the nut 173 and the nut insertion chamber 168 may be spaced apart from each other with a gap G1, G2, and the nut 173 is not constrained to the insulating cover 163, and, therefore, it can float in the nut insertion chamber 168. Furthermore, when the direction crossing the first direction is referred to as the second direction, the width of the nut 173 in the second direction may be formed to be smaller than the width of the nut insertion chamber 168 in the second direction. Therefore, the nut 173 can float in four directions in the nut insertion chamber 168, whereby the degree of freedom of the nut 173 can be increased.

A terminal busbar 153 may be positioned on an upper part of the nut insertion chamber 168 on which the nut 173 is mounted. The position is set when the busbar assembly 150 to which the terminal busbar 153 is fixed and the insulating cover 163 provided with the nut insertion chamber 168 are coupled with each other. A fastening hole is formed in the terminal busbar 153, and when a bolt is fastened to the nut 173 through the terminal busbar 153, the bolt can be fastened through the fastening hole. At this time, the diameter ($D_T$) of the fastening hole of the terminal busbar 153 may be formed to be larger than the diameter ($D_N$) of the screw hole of the nut 173, and the nut 173 may be formed such that an edge of screw hole 173*a* towards an inlet of the nut insertion chamber 168 is cut to be inclined. Further, the nut 173 is mounted in the nut insertion chamber 168 such that a screw hole at least partially overlaps with the fastening hole. Thereby, when the bolt is inserted into the nut 173 for electrical connection between the battery modules, the ease of fastening can be improved, and the working speed can be increased. This will be described later with reference to a schematic diagram.

Such a nut insertion chamber 168 and nut 173 being inserted therein may be disposed one by one on both sides of the insulating cover 163 in a planar direction, that is, on both sides in a first direction. Terminal connecting structures are respectively fastened to the nuts 173 disposed on both sides through bolts, so that they can be used for electrical connection with adjacent battery modules on both sides.

Figure 4:
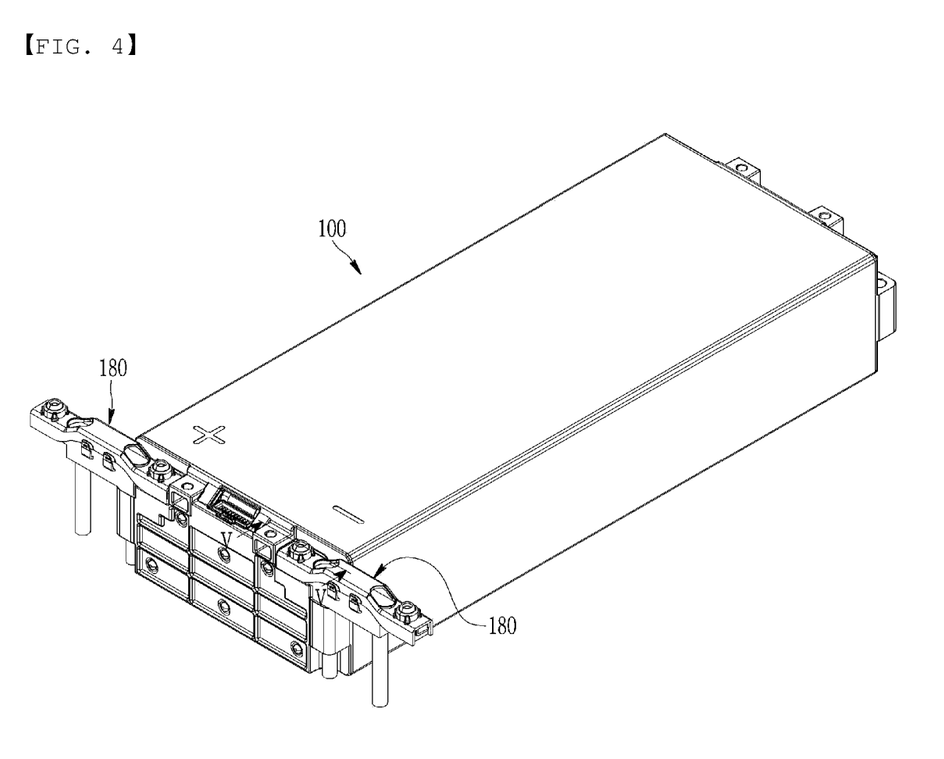
FIG. 4 is a perspective view illustrating a state in which a terminal connecting structure is fastened to a battery module according to one embodiment of the present disclosure.
Figure 5:
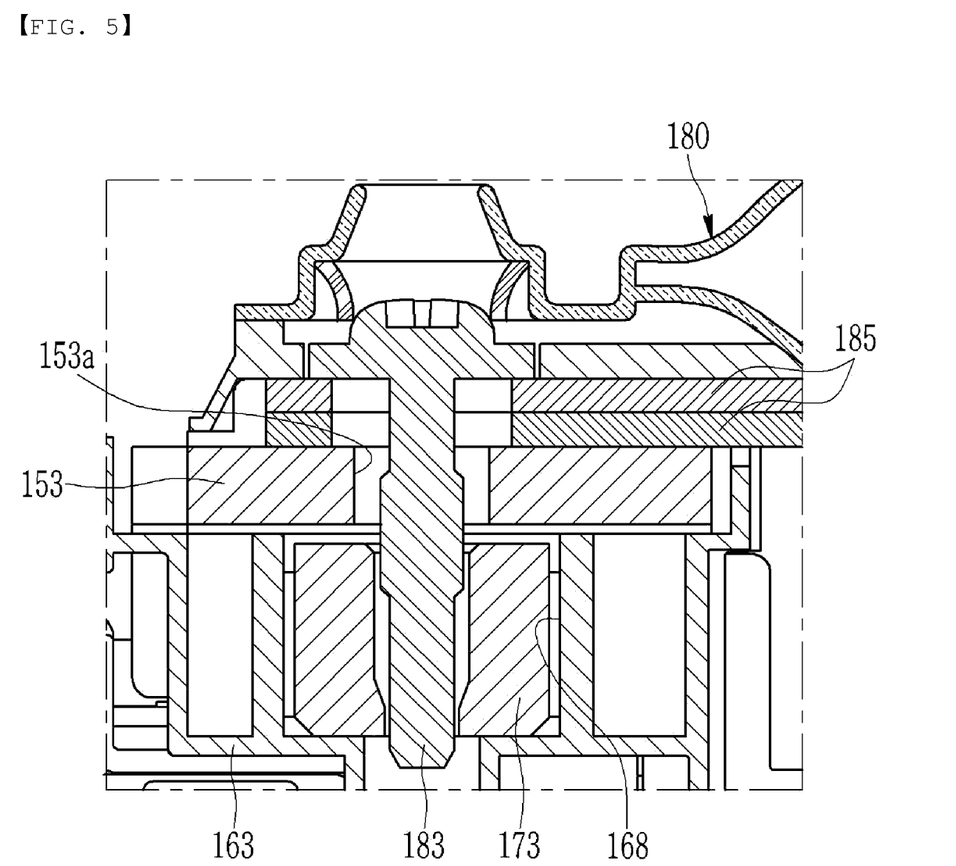
FIG. 5 is a cross-sectional view taken along line V-V of FIG. 4.

FIG. 4 is a perspective view illustrating a state in which a terminal connecting structure is fastened to a battery module according to one embodiment of the present disclosure, and FIG. 5 is a cross-sectional view taken along line V-V of FIG. 4.

Referring to FIG. 4, a terminal connecting structure 180 may be fastened to a module terminal part for fastening an adjacent battery module 100. The terminal connecting structure 180 may be fixed to an outer cover 165 of the insulating frame 160. The module terminal part may include a terminal busbar 153 and a nut 173 mounted in the nut insertion chamber 168. The outer cover 165 allows the terminal busbar 153 fixed to the busbar assembly 150 to be exposed while coupled with the insulating cover 163 and the busbar assembly 150, and while the terminal connecting structure 180 is fixed to the outer cover 165 being coupled to the terminal busbar 153, such that coupling with adjacent battery modules can be achieved.

Referring to FIG. 5, the terminal connecting structure 180 may include an inter-module busbar 185 that provides electrical connection between adjacent battery modules, and a bolt 183 for coupling the inter-module busbar 185 with the terminal busbar 153 of each battery module 100. That is, the bolt 183 may be screw-coupled to the screw hole of the nut 173 through the inter-module busbar 185 and the terminal busbar 153. At this time, the bolt 183 may be coupled to the nut 173 mounted in the nut insertion chamber 168 by passing through the fastening hole of the inter-module busbar 185 and the fastening hole 153*a* of the terminal busbar 153, respectively. Further, such a bolt 183 may be fixed to the outer cover 165 through the screw hole of the nut 173.

Figure 6A:
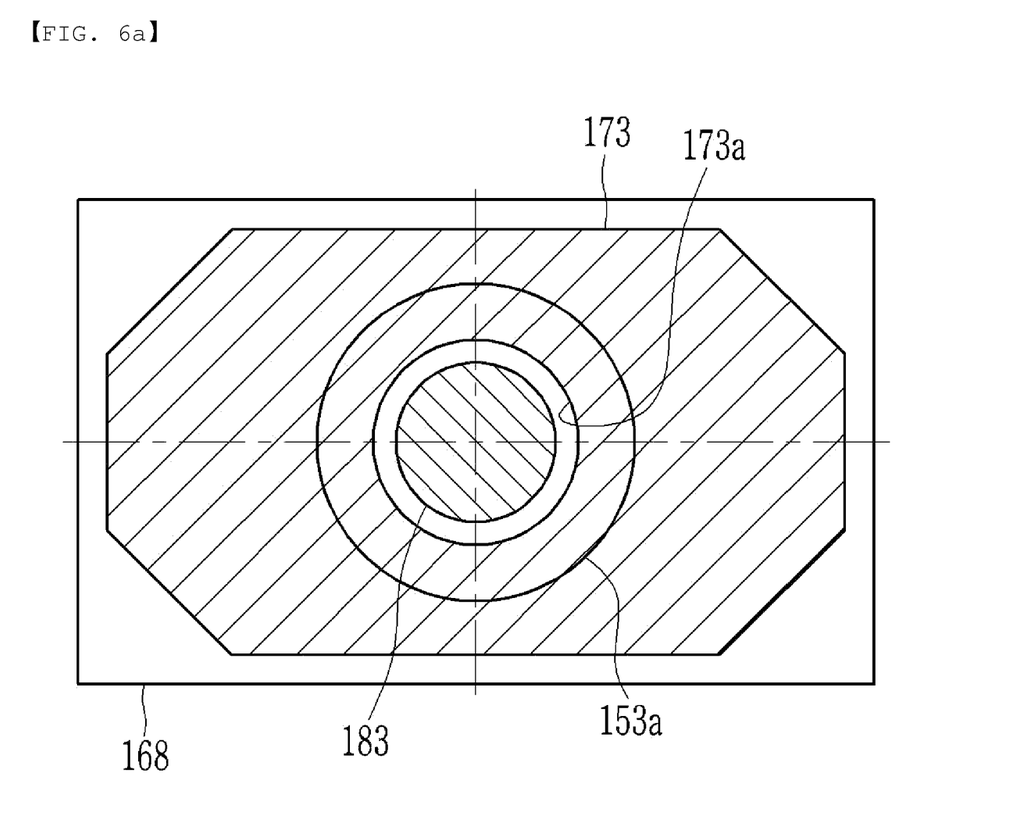
FIG. 6a illustrates a case where the bolt is located in a fixed position when fastening between adjacent battery modules.
Figure 6B:
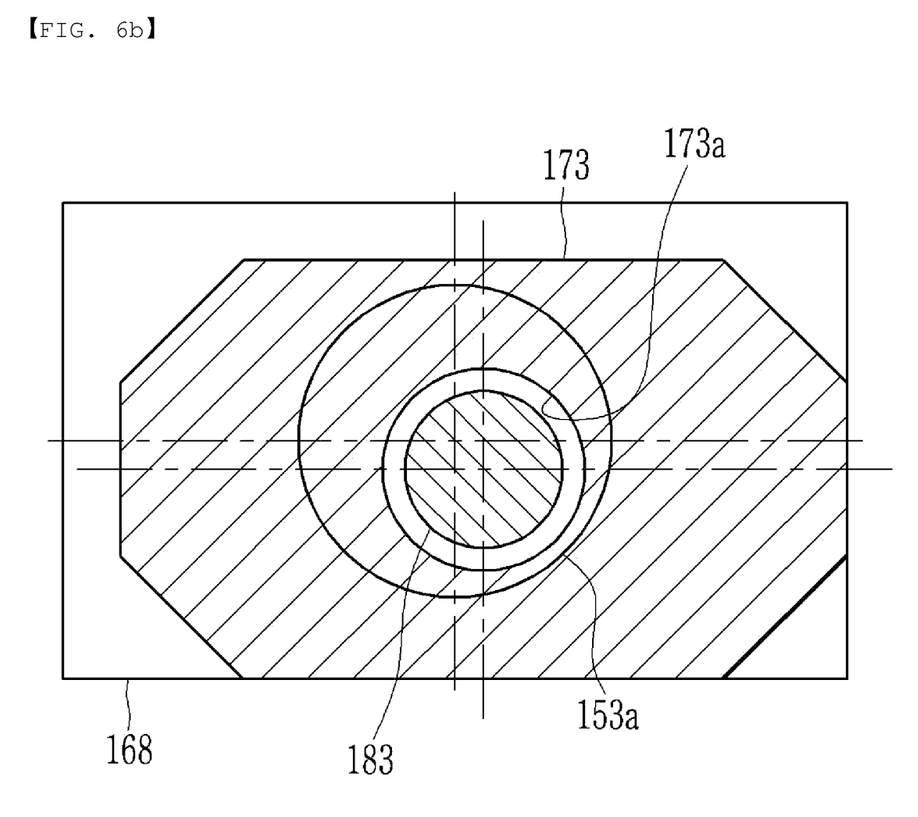
FIG. 6b illustrates a case where the position of the bolt is slightly deviated from the center of the fastening hole of the terminal busbar.

FIGS. 6*a* and 6*b* are schematic diagrams illustrating the relative positions of the bolt end, the fastening hole 153*a* of the terminal busbar, and the screw hole 173*a* of the nut in a state where the terminal connecting structure is fastened to the battery module according to one embodiment of the present disclosure. FIG. 6*a* illustrates a case where the bolt is located in a fixed position when fastening between adjacent battery modules, and FIG. 6*b* illustrates a case where the position of the bolt is slightly deviated from the center of the fastening hole 153*a* of the terminal busbar.

When the position of the bolt 183 is slightly dislocated from the fixed position, the end of the bolt 183 may be inserted by biasing to one side in the fastening hole 153*a* of the terminal busbar 153. In this case, since the nut 173 is set to a size capable of floating in the nut insertion chamber 168, the nut 173 may slightly move along the inserting position of the bolt 183. Therefore, to electrically connect the adjacent battery modules 100, it is not necessary to perform precise control to fasten the bolt 183 to the terminal busbar 153 and the nut 173. As the end of the bolt 183 is inserted into the fastening hole 153*a* of the terminal busbar 153, the nut 173 moves within the nut insertion chamber 168 so that the screw hole 173*a* of the nut 173 is aligned with the end of the bolt 183 and can be fastened without interference between the bolt 183 and the nut 173. That is, by increasing the degree of freedom of the nut 173, it is possible to absorb the tolerance and assembly tolerance of the bolt 183 to ensure the fastening property of the bolt 183 and the nut 173.

Figure 7A:
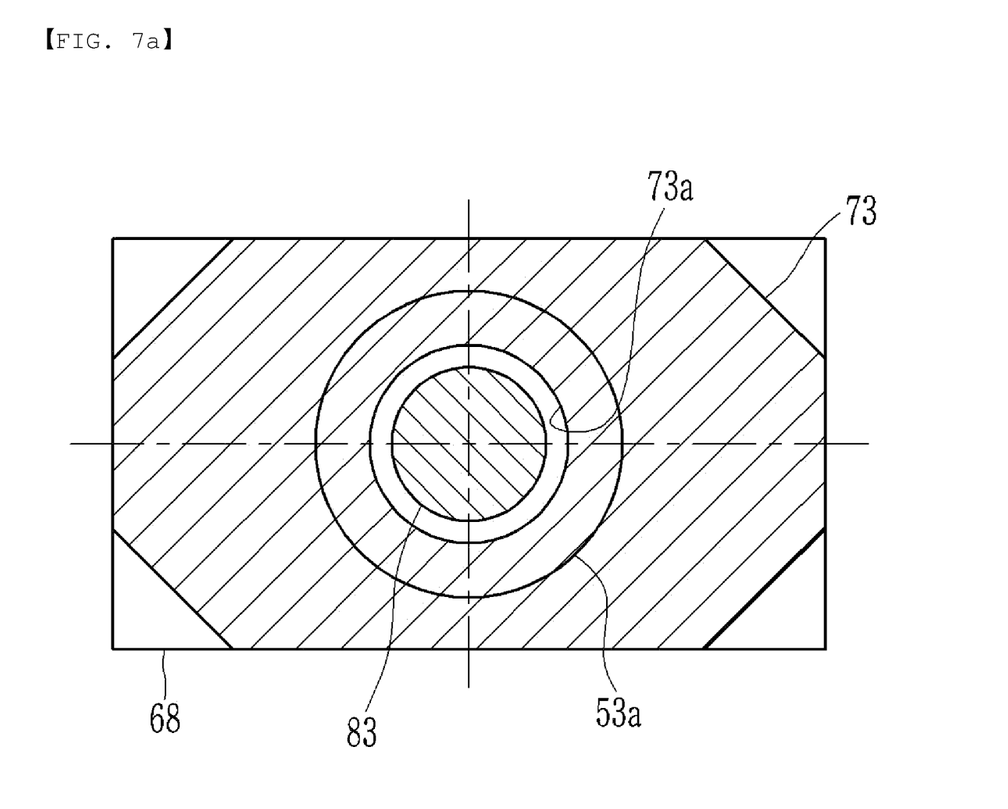
FIGS. 7a and 7b are schematic views illustrating the relative positions of the bolt end, the fastening hole of the terminal busbar, and the screw hole of the nut in a conventional bolt fastening structure.
Figure 7B:
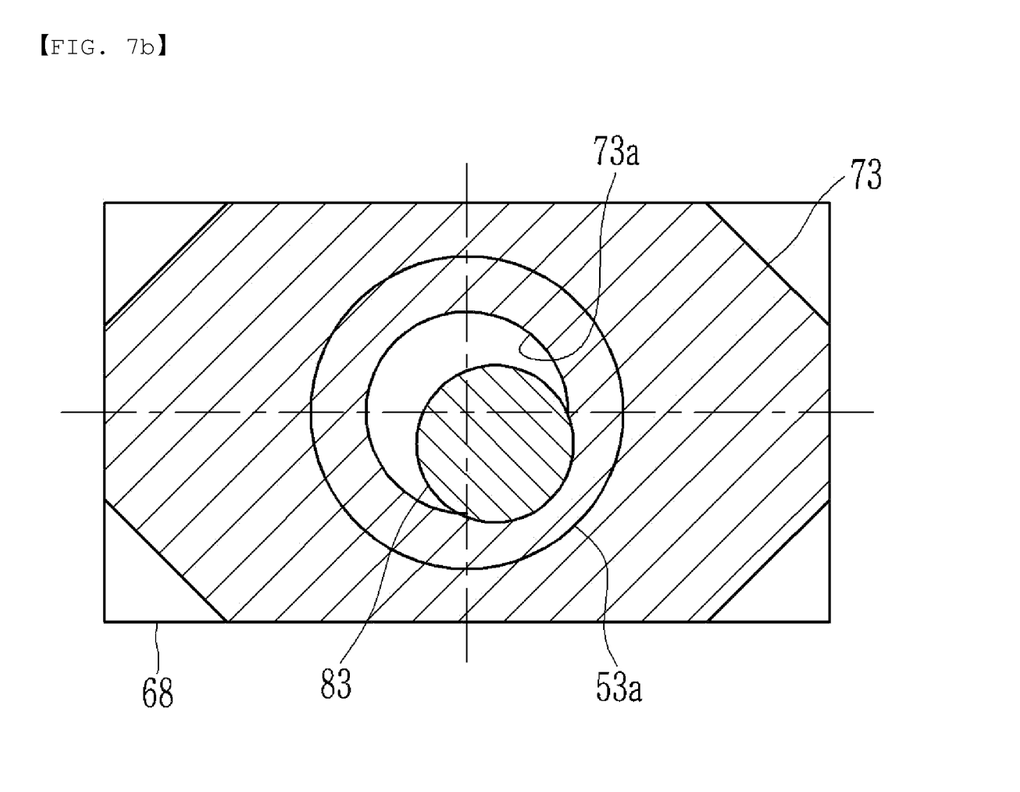

FIGS. 7*a* and 7*b* are schematic views illustrating the relative positions of the bolt end, the fastening hole of the terminal busbar, and the screw hole of the nut in a conventional bolt fastening structure.

Conventionally, a nut 73 was fixed to a terminal busbar of a battery module by laser welding or the like, and thus, could not be floated. In this case, as shown in FIG. 7*a*, when the bolt 83 is positioned at a fixed position, the screw hole 73*a* of the nut 73, the fastening hole 53*a* of the terminal busbar, and the bolt 83 are aligned and thus, no problems occur in the fastening. However, as shown in FIG. 7*b*, when the bolt 83 is dislocated from its fixed position, the nut 73 is fixed and cannot move even if the bolt 83 is located in the fastening hole 53*a* of the terminal busbar. Therefore, the bolt 83 is disposed outside the screw hole 73*a* of the nut 73, and the bolt 83 and the nut 73 interfere with each other, so that fastening becomes impossible. In the process of moving the bolt 83 again to search for the fixed position, the working time may be delayed, resulting in a deterioration in the fastening properties.

Meanwhile, the battery module according to one embodiment of the present invention may be packaged in a pack case while one or more of the battery modules are electrically connected to each other through a terminal connecting structure to form a battery pack. That is, a plurality of battery modules can be electrically connected by fixing the inter-module busbars connecting the terminal busbars of the adjacent battery modules using bolts, thereby constituting a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
135: module case
150: busbar assembly
151: busbar
153: terminal busbar
153a: fastening hole
155: busbar frame
160: insulating frame
163: insulating cover
165: outer cover
168: nut insertion chamber
173: nut
173a: screw hole
180: terminal connecting structure
183: bolt
185: inter-module busbar

The invention claimed is:

1. A battery module, comprising:
a cell assembly including at least one battery cell;
a busbar assembly including a terminal busbar electrically connected to an electrode lead of the cell assembly, and a busbar frame covering the cell assembly on at least one side and defining a nut insertion chamber adjacent to the terminal busbar;
an insulating frame covering the busbar assembly from an outside; and
a nut which is sized to float in the nut insertion chamber when the nut is mounted in the nut insertion chamber.

2. The battery module of claim 1,
wherein the nut insertion chamber has a rectangular planar cross-section,
wherein the width of a first direction of the nut is smaller than the width of a first direction of the nut insertion chamber.

3. The battery module of claim 2,
wherein the width of a second direction crossing the first direction of the nut is smaller than the width of a second direction of the nut insertion chamber.

4. The battery module of claim 1,
wherein a fastening hole is formed in the terminal busbar,
wherein the nut is mounted in the nut insertion chamber such that a screw hole of the nut at least partially overlaps with the fastening hole.

5. The battery module of claim 4,
wherein the diameter of the fastening hole of the terminal busbar is formed to be larger than the diameter of the screw hole of the nut.

6. The battery module of claim 1,
wherein the nut insertion chamber is-includes a first nut insertion chamber and a second nut insertion chamber, the first and second nut insertion chambers being disposed on opposite sides of a plane extending along a centerline of the insulating frame.

7. A battery module of claim 1,
wherein the nut has a screw hole with an edge that is inclined towards an inlet of the nut insertion chamber.

8. The battery module of claim 1,
wherein the insulating frame comprises an insulating cover positioned adjacent to the busbar assembly, and an outer cover covering the insulating cover and fixing a terminal connecting structure,
and the nut insertion chamber is provided on the insulating cover.

9. A battery pack comprising a plurality of battery modules according to claim 4,
wherein the battery pack comprises a bolt that penetrates through the fastening hole of the terminal busbar and the bolt is screw-coupled to the screw hole of the nut.

10. The battery pack of claim 9,
comprising a terminal connecting structure having an inter-module busbar connecting a terminal busbar of an adjacent battery module,
wherein the bolt is coupled to the nut through the inter-module busbar.

11. The battery pack of claim 9,
wherein the bolt is fixed to the insulating frame through the screw hole of the nut.

12. A device comprising at least one battery pack according to claim 9.

* * * * *